United States Patent [19]

Oka

[11] Patent Number: 5,049,863
[45] Date of Patent: Sep. 17, 1991

[54] CURSOR KEY UNIT FOR A COMPUTER HAVING A MOUSE FUNCTION REMOVABLY MOUNTED ON A KEYBOARD SECTION OF A BASE

[75] Inventor: Mayumi Oka, Oome, Japan

[73] Assignee: Kabushiki Kaisha Toshiba, Kawasaki, Japan

[21] Appl. No.: 477,458

[22] Filed: Feb. 9, 1990

[30] Foreign Application Priority Data

Feb. 10, 1989 [JP] Japan .................................. 1-31336

[51] Int. Cl.⁵ ........................ G06F 15/00; G09G 3/02
[52] U.S. Cl. .................................. 340/710; 340/709; 364/709.01
[58] Field of Search .................. 364/709.01, 709.08, 364/709.11, 709.12, 708; 340/706, 709, 710, 711

[56] References Cited

U.S. PATENT DOCUMENTS

| | | | |
|---|---|---|---|
| 4,181,966 | 1/1980 | Wenninger et al. | 364/715 |
| 4,654,818 | 3/1987 | Wetterau, Jr. | 364/704 |
| 4,736,191 | 4/1988 | Matzke et al. | 340/710 |
| 4,754,268 | 6/1988 | Mori | 340/710 |
| 4,917,516 | 4/1990 | Retter | 340/710 |
| 4,933,670 | 6/1990 | Wislocki | 340/710 |

FOREIGN PATENT DOCUMENTS 61-19829 2/1986 Japan .
63-276109 11/1988 Japan .
63-188740 12/1988 Japan .

*Primary Examiner*—Dale M. Shaw
*Assistant Examiner*—Long T. Nguyen
*Attorney, Agent, or Firm*—Cushman, Darby & Cushman

[57] ABSTRACT

A computer includes a key input unit having both cursor keys and a mouse mechanism, a keyboard having a holding section for detachably holding the key input unit, and a connector which electrically connects the key input unit and the keyboard together when the key input unit is held in the holding section of the keyboard. The computer further includes a signal transmitter which transmits a signal from the key input unit to the keyboard when the key input unit is removed from the holding section of the keyboard. The signal transmitter is made up of a light-emitting section and a light-receiving section. The light-emitting section is provided for the key input unit, and converts a signal entered from the key input unit into an optical signal and emits this optical signal. The light-receiving section is provided for the keyboard, and receives the optical signal emitted from the light-emitting section and converts the optical signal into an electric signal. Through the light-emitting section and light-receiving section, a signal entered from the key input unit is transmitted to the keyboard.

19 Claims, 6 Drawing Sheets

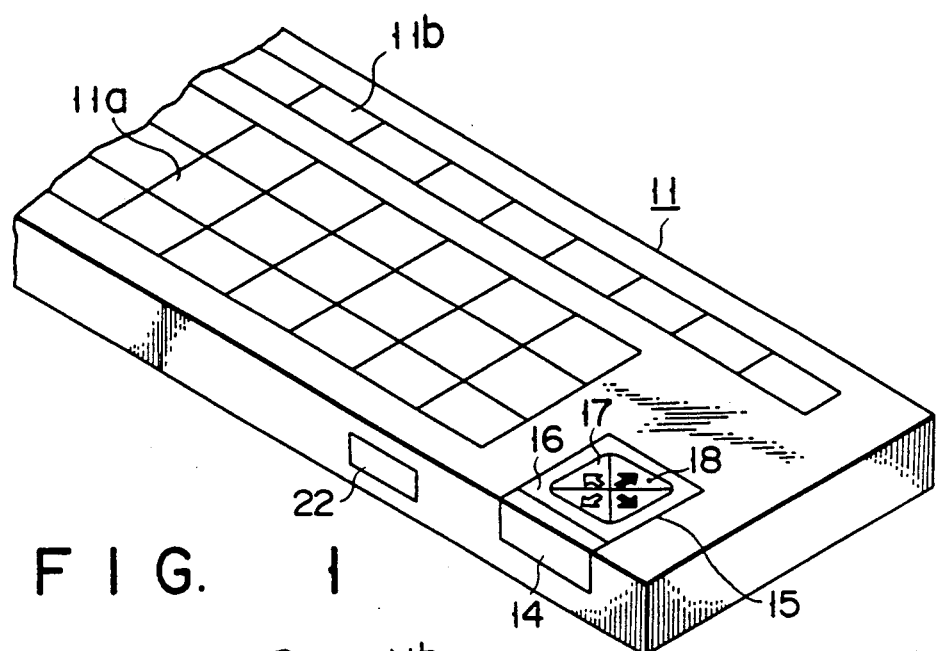
F I G. 1
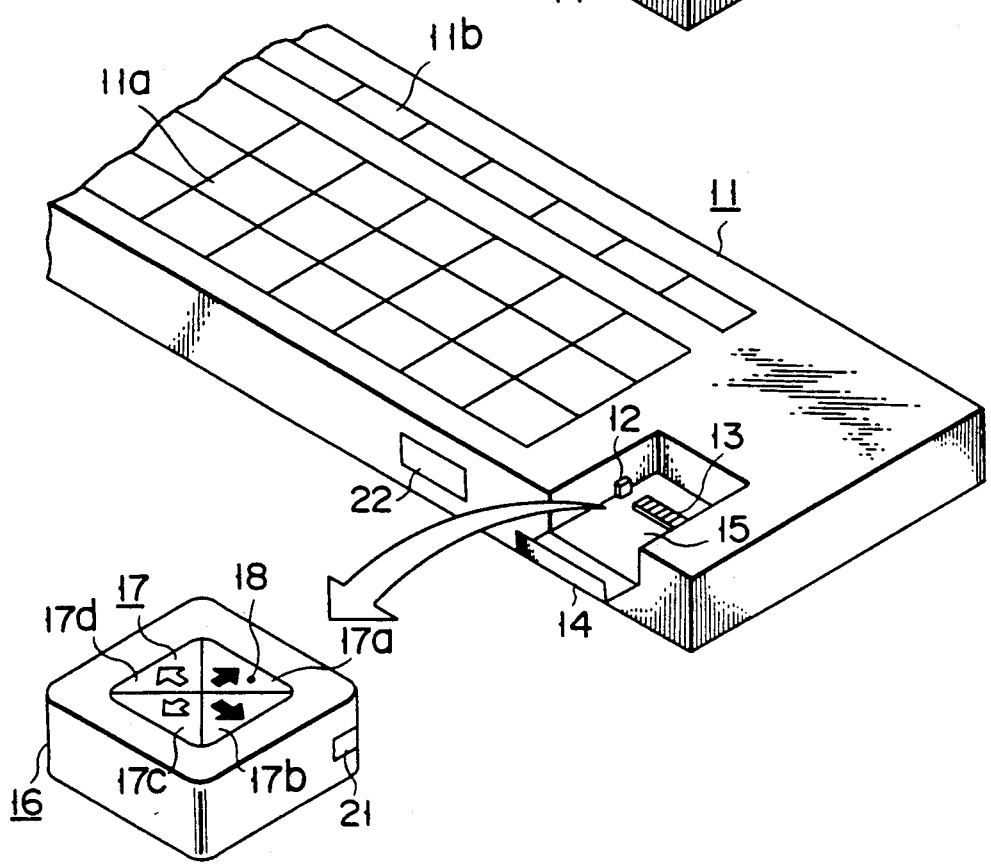
F I G. 2

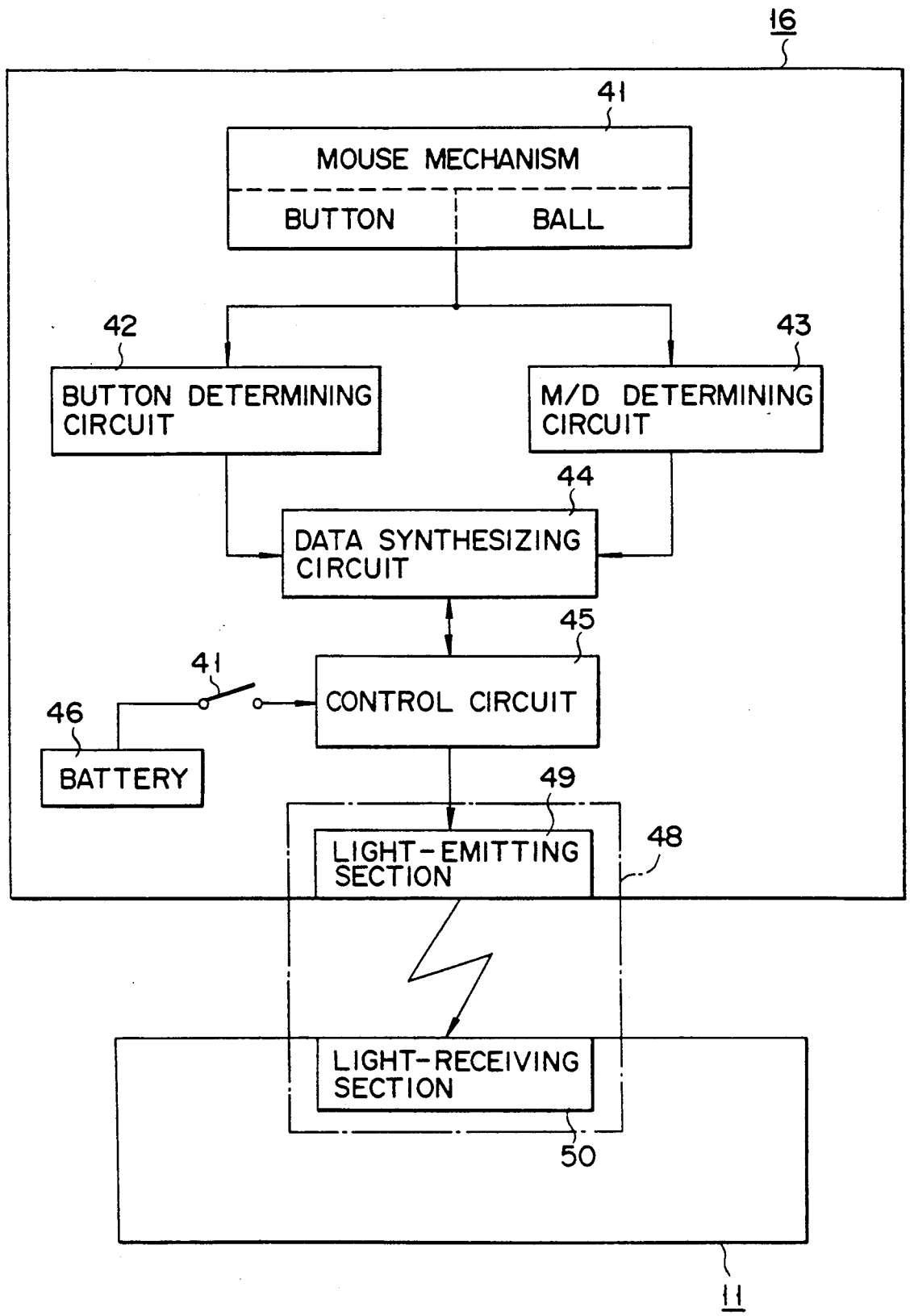
F I G. 7

CURSOR KEY UNIT FOR A COMPUTER HAVING A MOUSE FUNCTION REMOVABLY MOUNTED ON A KEYBOARD SECTION OF A BASE

BACKGROUND OF THE INVENTION

1. Field of the Invention

The present invention relates to a computer such as a lap top type, and more particularly to a computer suitable for a data input operation using a mouse.

2. Description of the Related Art

Conventionally, a mouse, which is one type of input device, has been provided as an option, independently of the main body of a computer. Therefore, the mouse has to be connected to the main body by means of a cable (cord), so as to enter data. When the mouse is not used, it has to be disconnected from the main body and kept independently of the main body.

The mouse has to be connected or disconnected from the main body of the computer/each time the data input operation using the mouse is performed. To the user, the connection and disconnection of the mouse is very troublesome to perform. If the mouse is used with a portable computer, such as a lap top type, it has to be carried independently of the computer. This is very inconvenient in practice.

SUMMARY OF THE INVENTION

Accordingly, an object of the invention is to provide a computer which eliminates the need for the connection and disconnection of a mouse and the need to independently carry the mouse, and which permits a data input operation to be easily performed by use of a mouse at any time.

To achieve this object, the present invention provides a computer which comprises: key input means, having cursor keys and a mouse mechanism, for inputting data; a keyboard having a holding section for removably (or detachable) holding the key input means; connection means for electrically connecting the key input means and the keyboard together when the key input means is held in the holding section of the keyboard; and signal transmission means for transmitting a signal from the key input means to the keyboard when the key input means is removed from the holding section of the keyboard.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a perspective view showing a state where a key input unit according to the first embodiment of the invention is fitted in a keyboard;

FIG. 2 is a perspective view showing a state where the key input unit is removed from the keyboard;

FIG. 7 is a block diagram of the circuit which provides the key input unit with a mouse function;

DETAILED DESCRIPTION OF THE PREFERRED EMBODIMENT

Figure 3:
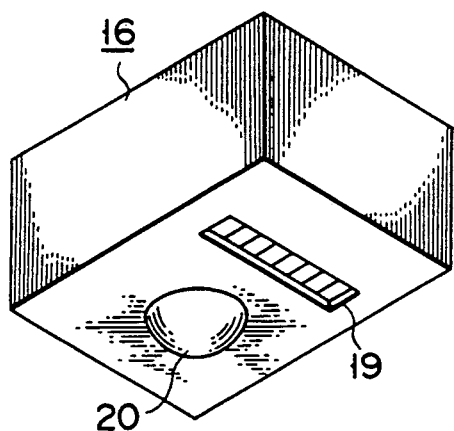
FIG. 3 is a perspective view showing the structure of the bottom portion of the key input unit.

A computer according to the first embodiment of the present invention will now be described, with reference to the accompanying drawings.

As is shown in FIGS. 1 and 2, the keyboard 11 of the computer has a plurality of data input keys 11a and function keys 11b. A holding section 15 having a projection 12, a male-type connector 13 and a lid 14 is provided at a predetermined portion of the keyboard 11. A key input unit 16 serving as key input means can be removably fitted in the holding section 15.

The key input unit 16 has cursor keys 17, which include keys 17a–17d used for moving the cursor upward, rightward, downward, and leftward, respectively. As is shown in FIG. 1, the key input unit 16 is fitted in the holding section 15 of the keyboard 11, such that key 17a having a small projection 18 thereon can be used for moving the cursor upward. When the key input unit 16 has been fitted in the holding section 15, a female-type connector 19 (FIG. 3) formed in the bottom face of the key input unit 16 is brought into engagement with the male-type connector 13 located inside the holding section 15. Due to the engagement between these connectors 13 and 19, the key input unit 16 is electrically connected to the keyboard 11 and thus serves as cursor keys.

The key input unit 16 has a mouse mechanism including a mouse ball 20, such as that shown in FIG. 3. In the state where the key input unit 16 is removed from the keyboard 11, a power source (e.g., a button-type battery [not shown]), is switched on by a switch mechanism, such as that shown in FIG. 4. The power source is used for enabling the mouse mechanism to function, and is built in the key input unit 16. When the power source is on, the key input unit 16 serves as a mouse. Signals entered from the mouse mechanism are first converted into optical signals, and are then transmitted from a light-emitting 21 window formed in a side face of the key input unit 16 to a light-receiving window 22 formed in a side face of the keyboard 11. The optical signals received from the light-receiving window 22 are converted into electric signals in the keyboard.

When the key input unit 16 functions as a mouse, two of the cursor keys 17 (e.g., keys 17a and 17b for moving the cursor upward and rightward, respectively) are used as mouse buttons, namely, an execution button and a cancel button.

Figure 4:
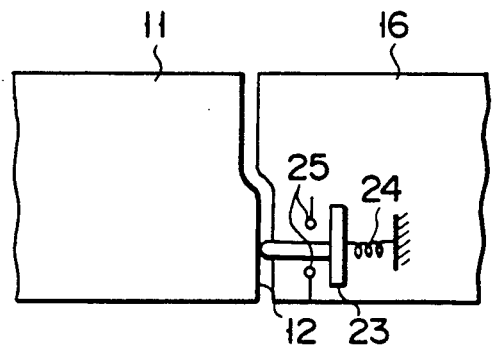
FIG. 4 is a side view showing the structure of the switch mechanism incorporated in the key input unit.

FIG. 4 is a side view of the switch mechanism mentioned above. When the key input unit 16 is removed from the holding section 15 of the keyboard 11, a switch member 23 located within the key input unit 16 is pressed against a contact 25, due to the urging force of a spring member 24. As a result, the power source for allowing the mouse mechanism to function is switched on. When the key input unit 16 is fitted in the holding section 15, the tip end of the switch member 13 abuts the projection 12 of the holding section 15. Since, in this condition, the switch member 23 is separated from the contact 25, the power source is kept off.

Figure 5:
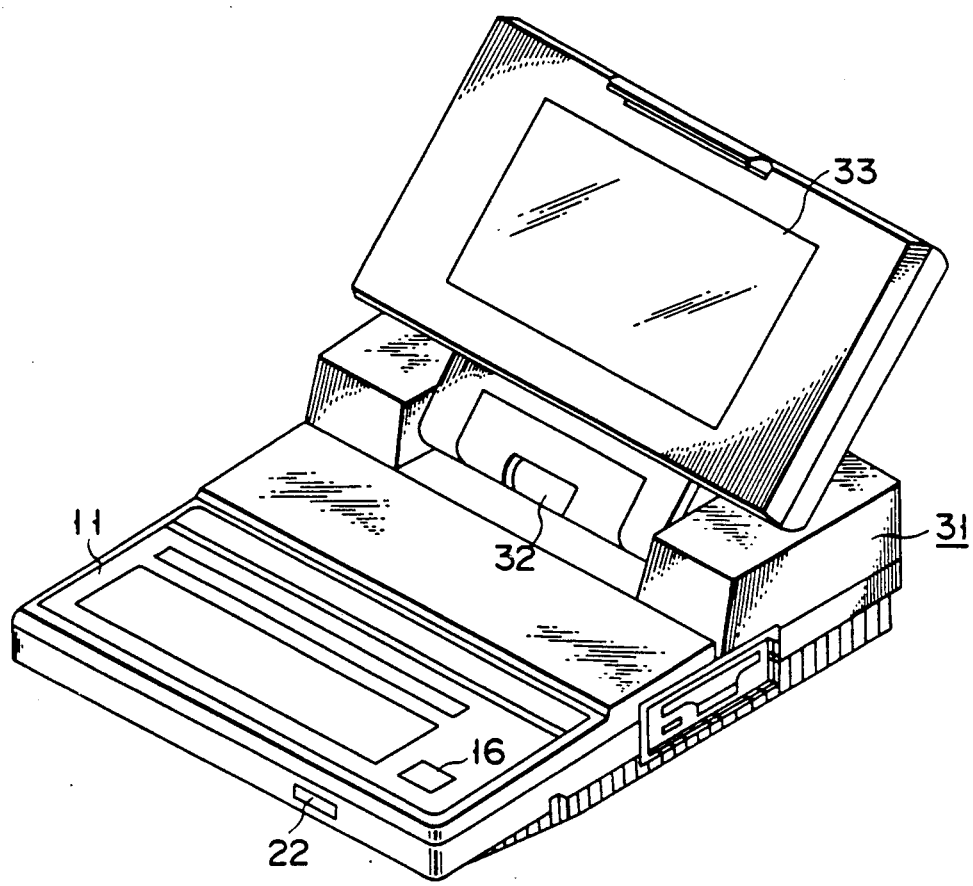
FIG. 5 is a perspective view showing the outward appearance of a computer of the present invention.

FIG. 5 is a perspective view showing the outward appearance of a lap top type computer. The keyboard shown in FIGS. 1 and 2 are integral with the main body 31 of the computer. The main body 31 of the computer has a flat display device 33, and this display device 33 can be opened or closed with reference to the main body 31, with a shaft 32 as a center. This type of computer can be easily carried, with the keyboard 11 overlaid with the display device 33.

Figure 6:
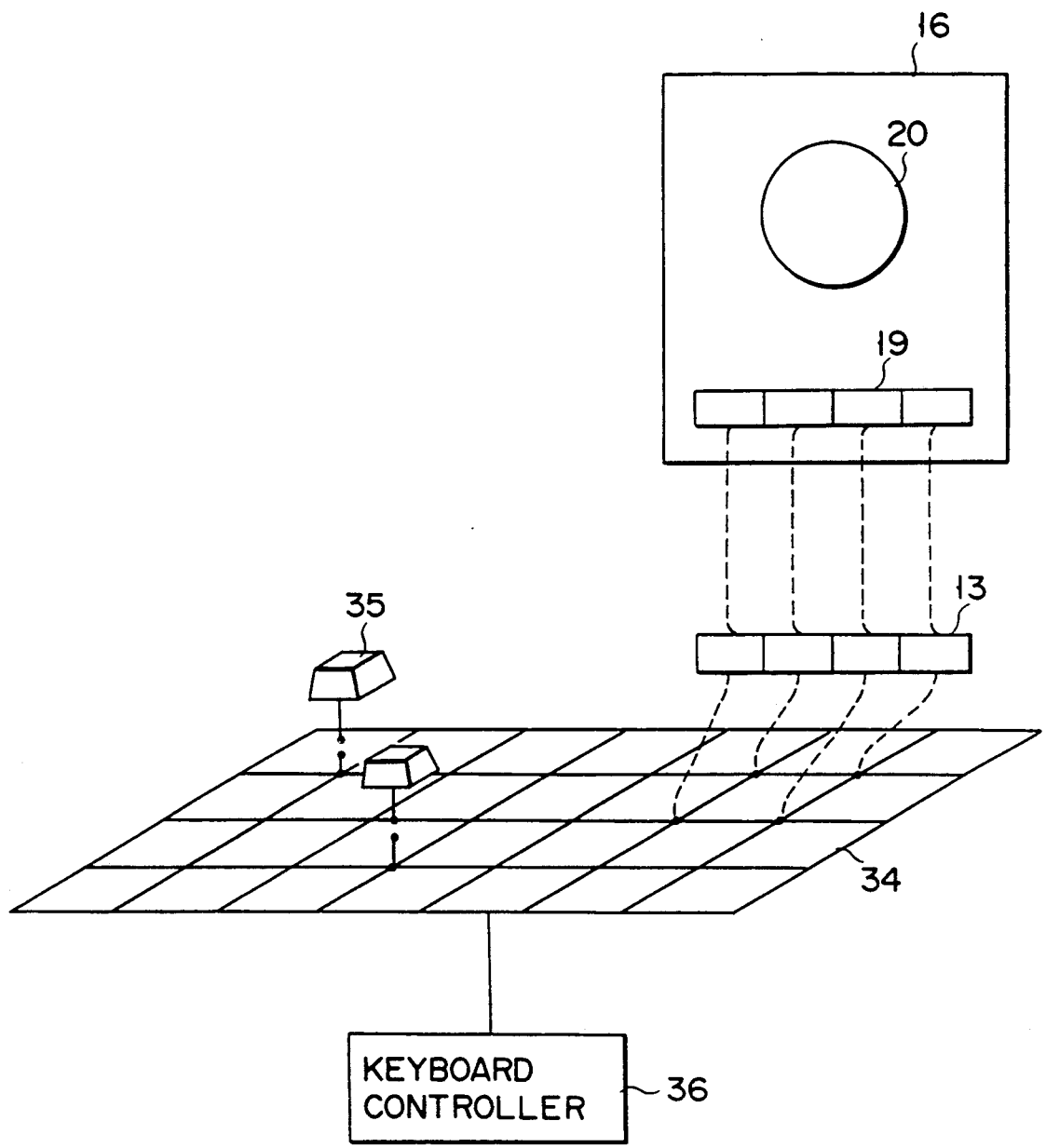
FIG. 6 is a view showing the electric connection obtained when the key input unit is fitted in the keyboard.

FIG. 6 is a view showing the electric connection obtained when the key input unit 16 is fitted in the keyboard 11. When the key input unit 16 is fitted in the holding section 15 of the keyboard 11, each of the four cursor keys 17a–17d is connected to a predetermined contact of a keyboard matrix 34, through the connectors 19 and 13. Signals entered through the connectors 19 and 13 are similar to signals which represent the on/off state of key tops 35 arranged on the keyboard matrix 34. The keyed-in information entered through the keyboard matrix 34 is input to a keyboard controller 36.

FIG. 7 is a block diagram of the circuit which provides the key input unit 16 with a mouse function. Referring to FIG. 7, a mouse mechanism 41 comprises a mouse ball (i.e., the ball 20 shown in FIG. 3), mouse buttons (i.e., keys 17a and 17b shown in FIG. 2), etc. A mouse button determining circuit 42 determines whether or not the mouse buttons (i.e., two keys 17a and 17b which are designated as execution and cancel buttons, respectively) are depressed. A movement/direction determining circuit 43 determines the moving distance and moving direction of the key input unit 16, on the basis of the degree and direction of the rotation of the ball 20. A data synthesizing circuit 44 synthesizes output signals of the mouse button determining circuit 42 with output signals of the movement/direction determining circuit 43. A control circuit 45 is constituted by a microprocessor, for example, and controls the entire circuit. More specifically, the control circuit 45 converts parallel signals output from the data synthesizing circuit 44 into serial signals, and outputs these serial signals to signal transmission means 48 mentioned later.

The battery 46 indicated in FIG. 7 is a button-type battery, for example. As was explained with reference to FIG. 4, it serves as the power source used when the key input unit 16 functions as a mouse. The battery 46 is connected to the control circuit 45 through a switch mechanism 47. This switch mechanism 47 is made up of a switch member 23, a spring member 24, and a contact 25, as is shown in FIG. 4, and allows power to be supplied from the battery 46 to the control circuit 45 in the state where the key input unit 16 is removed from the keyboard 11. When the control circuit 45 is supplied with power, the key input unit 16 is provided with a mouse function.

The signal transmission means 48 is made up of a light-emitting section 49 provided for the key input unit 16 and a light-receiving section 50 provided for the keyboard 11. The light-emitting section 49 includes e.g. a light emitting diode, and converts an output signal (i.e., a signal entered from the mouse mechanism of the key input unit 16) into an optical signal and emits this optical signal. The light-receiving section 50 includes e.g. a photodiode, and receives the optical signal emitted from the light-emitting section 49 and converts this optical signal into an electric signal.

Figure 8:
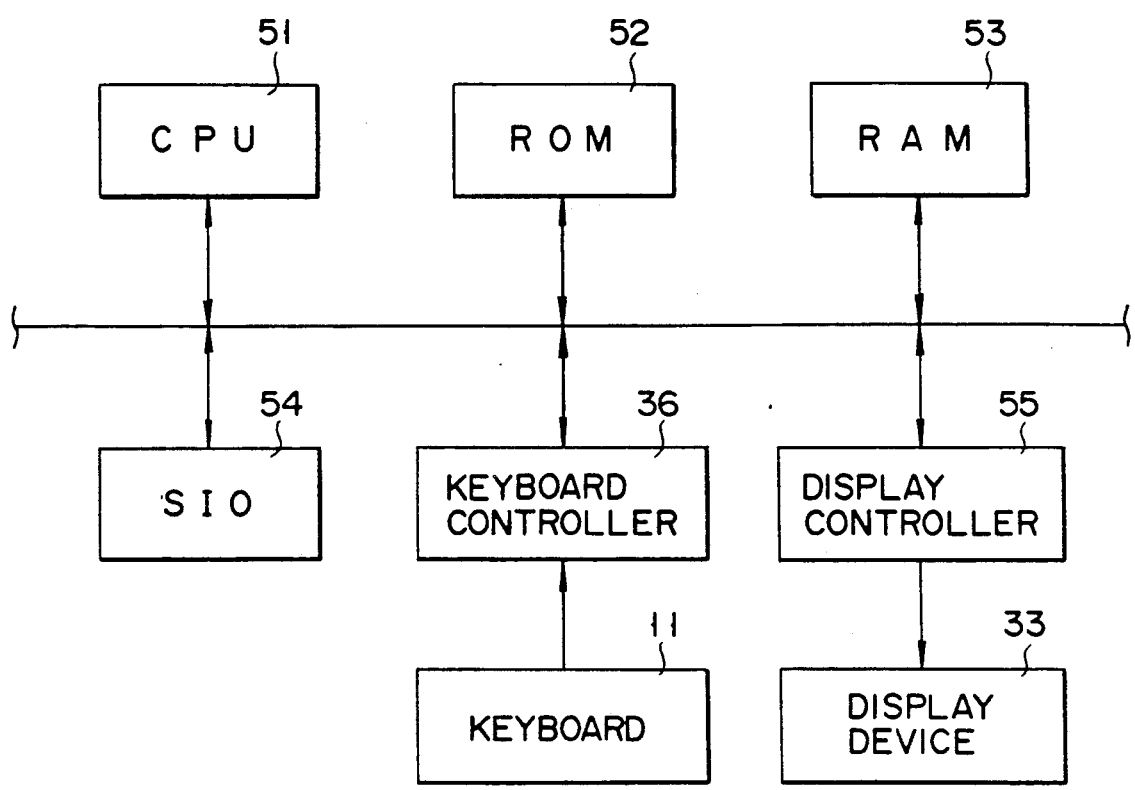
FIG. 8 is a block diagram showing the system arrangement of the computer of the present invention.

FIG. 8 is a block diagram showing the system arrangement of the computer. As is shown, the computer comprises a CPU 51, a ROM 52, a RAM 53, an SIO (i.e., a Serial Input/Output) 54, a keyboard controller 36, a display controller 55, a display device 33, and a keyboard 11. In the state where the key input unit 16 is fitted in the keyboard 11, signals which are input by operating cursor keys 17 of the key input unit 16 are sent to the keyboard controller 36, like the signals which are input by operating the other keys of the keyboard 56. The signal processing performed thereafter is similar to that performed in an ordinary computer system. In the case where the key input unit 16 is removed from the keyboard 11, signals input from the mouse mechanism of the key input unit 16 are converted into signals which satisfy the requirements of a transmission format such as RS-232C. After the conversion, the signals are input to the SIO 54. If the signal transmission means 38 utilizes optical transmission, as is shown in FIG. 7, then the light-receiving section 50 of the signal transmission section 38 is connected to the SIO 54. The light-receiving section 50 receives optical signals emitted from the light-emitting section 49, converts the optical signals into electric signals, and outputs the electric signals to the SIO 54. The signal processing performed thereafter is similar to that performed in an ordinary computer system.

A description will be given as to how the above-mentioned embodiment is used in practice.

To input data by use of cursor keys, the key input unit 16 is fitted in the holding section 15 of the keyboard 11, as is shown in FIG. 1. In this condition, the key input unit 16 is electrically connected to the keyboard 11 through the connectors 13 and 19 and thus functions as cursor keys. Therefore, the cursor on the display screen of the display device 33 shown in FIG. 5 can be moved in response to the operation of the four keys 17a–17d, as in the case where an ordinary keyboard is used. In this case, the power source for allowing the mouse mechanism to function is kept off by the switch mechanism shown in FIG. 4. Therefore, the key input unit 16 does not serves as a mouse.

To input data by use of a mouse, the lid 14 is opened and the key input unit 16 is taken out of the holding section 15. By doing so, the power source built in the key input unit 16 is turned on by the switch mechanism shown in FIG. 4. While the power source is on, the key input unit 16 serves as a mouse. More specifically, when the ball 20 of the key input unit 16 is moved on a desk or the like, the degree and direction of the rotation of the ball 20 are detected as the moving distance and moving direction of the key input unit 16, respectively. The detected signals are converted into optical signals, and are then transmitted from the light-emitting window 21 of the key input unit 16 to the light-receiving window 22 of the keyboard 11. The optical signals received at the light-receiving window 22 are converted into electric signals in the keyboard 11. In this fashion, the cursor on the display screen is moved in response to the movement of the key input unit 16.

When the key input unit 16 is used as a mouse, two of the four cursor keys 17a–17d (e.g., keys 17a and 17b) are used as mouse buttons, namely an execution button and a cancel button. For easy distinction, the two cursor keys are indicated in a different color from that of the other keys. When the two keys are operated, signals generated thereby are converted into optical signals and are output from the light-emitting window 21 of the key input unit 16 to the light-receiving window 22 of the keyboard 11.

As mentioned above, the key input unit 16 has both a cursor key function and a mouse function. If this type of key input unit is used, the connection and disconnection of a mouse is no longer required, and the mouse need not be carried independently of the main body of the computer. Moreover, the use of the key input unit permits a data input operation to be easily performed by use of a mouse at any time. The key input unit is particularly advantageous when used as an input device of a lap top type computer or a further smaller portable computer, such as a notebook-sized or pocketbook-sized computer. It should be also noted that the key input unit 16 is cordless and operates by remote control when it is used as a mouse. Since the key input unit 16 eliminates the need to use a cable or cord, it is easier to use than the conventional mouse.

Figure 9:
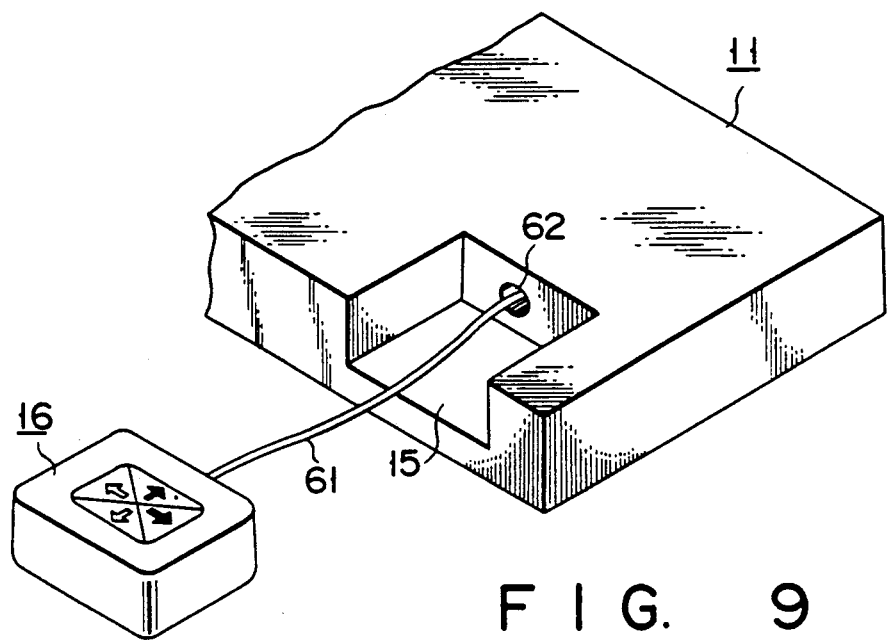
FIG. 9 is a perspective view showing how a key input unit according to the second embodiment of the invention is connected to a keyboard.

FIG. 9 illustrates the construction obtained by the second embodiment of the present invention. In the second embodiment, signals entered from the key input unit 16 are transmitted to the keyboard 11 through a cable 61. As is shown, the cable 61 is fixedly connected to both the keyboard 11 and the key input unit 16. When the key input unit 16 is fitted in the holding section 15 of the keyboard 11, the cable 61 is received into the interior of the keyboard 11 through the cord hole 62 of the holding section 15 and is wound inside the keyboard 11 by a cord-winding mechanism (not shown).

Figure 10:
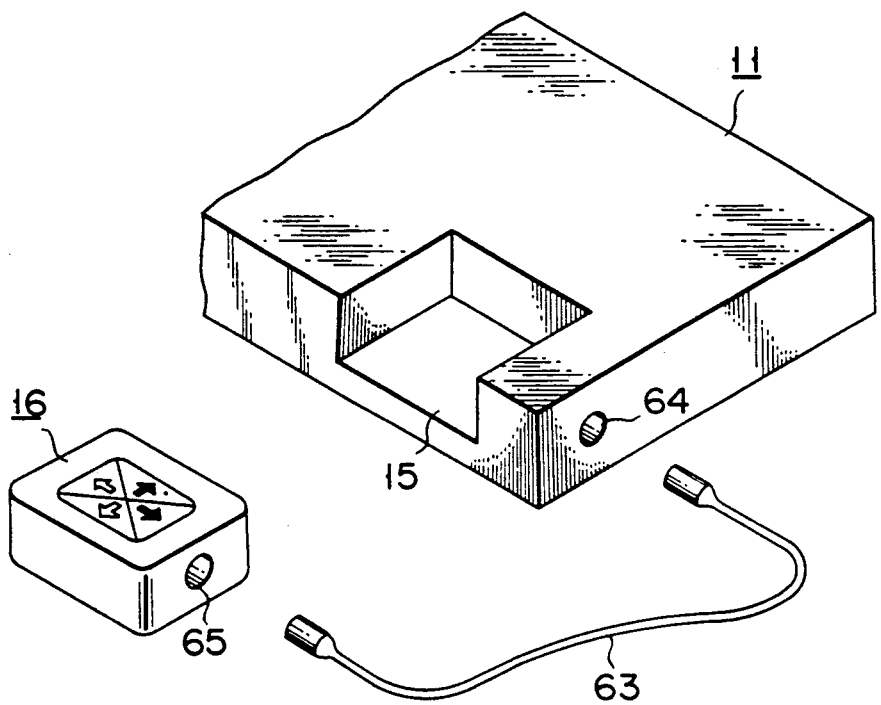
FIG. 10 is a perspective view showing how a key input unit according to the third embodiment of the invention is connected to a keyboard.

FIG. 10 illustrates the construction obtained by the third embodiment of the present invention. In the third embodiment, signals entered from the key input unit 16 are transmitted to the keyboard 11 through a cable 63. This cable 63 is a detachable type and is provided, independently of the key input unit 16 and the keyboard 11. The cable 63 is detachably connectable to both the connector 64 of the keyboard 11 and the connector 65 of the key input unit 16.

Additional advantages and modifications will readily occur to those skilled in the art. Therefore, the invention in its broader aspects is not limited to the specific details, representative devices shown and described herein. Accordingly, various modifications may be made without departing from the spirit or scope of the general inventive concept as defined by the appended claims and their equivalents.

I claim:

1. An input unit for a computer comprising;
   a base unit including a keyboard section having a keyboard and a holding portion;
   a cursor key unit having cursor keys and a mouse mechanism removably mounted on the holding portion;
   connection means for electrically connecting the cursor key unit and the base unit when the cursor key unit is mounted on the holding portion; and
   signal transmission means for transmitting a signal from the cursor key unit to the base unit when the cursor key unit is removed from the holding portion.

2. An input unit according to claim 1, wherein the cursor key unit is an integral combination of both the cursor keys and the mouse mechanism, and some of the cursor keys are used as mouse buttons of the mouse mechanism.

3. An input unit according to claim 1, wherein the keyboard includes a plurality of data input keys and function keys.

4. An input unit according to claim 1, wherein the connection means includes a first connector provided for the cursor key unit, and a second connector provided for the keyboard and engageable with the first connector, the cursor key unit being electrically connected to the keyboard through the first and second connectors.

5. An input unit according to claim 1, wherein the signal transmission means includes a cable which electrically connects the cursor key unit and the keyboard together and which transmits a signal from the cursor key unit to the keyboard.

6. An input unit according to claim 5, wherein the cable is fixedly connected to both the cursor key unit and the keyboard.

7. An input unit according to claim 5, wherein the cable is detachably connected to both the cursor key unit and the keyboard.

8. An input unit according to claim 1, further comprising a display unit pivotally connected to the base unit, the display unit being rotatable between an open position for operating the computer and a closed position for covering the keyboard and the cursor key unit mounted on the holding portion.

9. An input unit according to claim 1, wherein the signal transmission means includes light-emitting means for converting a signal entered from the cursor key unit into an optical signal and outputting the optical signal and light-receiving means for receiving the optical signal output from the light-emitting means and converting the optical signal into an electrical signal.

10. An input unit with a mouse function for a computer comprising:
    key input means, having cursor keys and a mouse mechanism, for inputting data;
    a keyboard having a holding section for removably holding the key input means;
    cursor key function means for permitting the cursor keys to function when the key input means is held in the holding section of the keyboard;
    mouse function means for permitting the mouse mechanism to function when the key input means is removed from the holding section of the keyboard;
    connection means for transmitting a signal input from the cursor keys of the key input means to the keyboard when the cursor keys are made to function by the cursor key function means; and
    signal transmission means for transmitting a signal input from the mouse mechanism of the key input means to the keyboard when the mouse mechanism is made to function by the mouse function means.

11. An input unit according to claim 10, wherein the key input means is an integral combination of both the cursor keys and the mouse mechanism, and some of the cursor keys are used as mouse buttons of the mouse mechanism.

12. An input unit according to claim 10, wherein the keyboard includes a plurality of data input keys and function keys.

13. An input unit according to claim 10, wherein the cursor key function means includes a circuit for electrically connecting the cursor keys of the key input means to predetermined points on a keyboard matrix of the keyboard when the key input means is held in the holding section of the keyboard.

14. An input unit according to claim 10, wherein the mouse function means includes a switch mechanism for turning off a power source used for allowing the mouse mechanism of the key input means to function, when the key input means is held in the holding section of the keyboard, and for turning on the power source when the key input means is removed from the holding section of the key input means.

15. An input unit according to claim 10, wherein the connection means includes a first connector provided for the key input means, and a second connector provided for the keyboard and engageable with the first connector, whereby a signal input from the cursor keys of the key input means is transmitted to the keyboard through the first and second connectors.

16. An input unit according to claim 10, wherein the signal transmission means includes a cable which electrically connects the key input means and the keyboard together and which transmits a signal entered from the mouse mechanism of the key input means to the keyboard.

17. An input unit according to claim 16, wherein the cable is fixedly connected to both the key input means and the keyboard.

18. An input unit according to claim 16, wherein the cable is detachably connected to both the key input means and the keyboard.

19. An input unit to claim 10, wherein the signal transmission means includes light-emitting means for converting a signal entered from the key input means into an optical signal and outputting the optical signal and light-receiving means for receiving the optical signal output from the light-emitting means and converting the optical signal into an electrical signal.

* * * * *